(12) United States Patent
Nalla et al.

(10) Patent No.: US 12,543,153 B2
(45) Date of Patent: Feb. 3, 2026

(54) REDUCTION IN PAGING TRAFFIC IN GNB USING NEAR REAL-TIME RAN INTELLIGENT CONTROLLER XAPP

(71) Applicant: Rakuten Symphony, Inc., Tokyo (JP)

(72) Inventors: Pradeep Kumar Nalla, Bangalore (IN);
Kavita Bhandari, Bangalore (IN);
Anudeep Repaka, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 309 days.

(21) Appl. No.: 18/020,764

(22) PCT Filed: Nov. 11, 2022

(86) PCT No.: PCT/US2022/049656
§ 371 (c)(1),
(2) Date: Feb. 10, 2023

(87) PCT Pub. No.: WO2024/102139
PCT Pub. Date: May 16, 2024

(65) Prior Publication Data
US 2024/0314739 A1    Sep. 19, 2024

(51) Int. Cl.
*H04W 68/04* (2009.01)
*H04W 68/02* (2009.01)
*H04W 68/08* (2009.01)

(52) U.S. Cl.
CPC ........... *H04W 68/04* (2013.01); *H04W 68/02* (2013.01); *H04W 68/08* (2013.01)

(58) Field of Classification Search
CPC ...... H04W 68/02; H04W 68/04; H04W 68/08
USPC ......................................................... 455/458
See application file for complete search history.

(56) References Cited

U.S. PATENT DOCUMENTS

2022/0408377 A1* 12/2022 Kotaru ................ H04W 52/241

* cited by examiner

*Primary Examiner* — Joel Ajayi
(74) *Attorney, Agent, or Firm* — Sughrue Mion, PLLC

(57) ABSTRACT

An Open Radio Access Network (O-RAN) communication system includes a GNB Central Unit Control Plane (GNB-CUCP) to establish a connection with a Near-RT RIC via an E2 interface; a User Equipment (UE); a plurality of cells in a Tracking Area (TA) of the GNB-CUCP; and an O-RAN Near-Real Time (Near-RT) RAN Intelligent Controller (RIC) to host an xApp and initiate a subscription procedure with the UE. The GNB-CUCP sends cell location information of the UE to the Near-RT RIC upon a UE context release procedure, the Near-RT RIC creates and maintains a record of the cell location information received from the GNB-CUCP via the xApp, and the GNB-CUCP pages the UE in a subset of cells from the plurality of cells in the TA, the subset of cells corresponding to the record of cell location information created and maintained by via the xApp.

18 Claims, 5 Drawing Sheets

REDUCTION IN PAGING TRAFFIC IN GNB USING NEAR REAL-TIME RAN INTELLIGENT CONTROLLER XAPP

CROSS-REFERENCE TO RELATED APPLICATION

This application is a national stage application of International Application No. PCT/US2022/049656, filed on Nov. 11, 2022, and designated the U.S., the entire contents of which are herein wholly incorporated by reference.

TECHNICAL FIELD

In some example embodiments, the subject matter herein generally relates to paging in a Radio Access Network (RAN) (O-RAN), and more specifically to reduction of paging traffic in next generation node B (GNB) using Near Real-Time (RT) RAN Intelligent Controller (RIC) xApp.

BACKGROUND

When a User Equipment (UE) is in an active state, its location is known by the network at the cell level. However, when the UE is in an idle state, its location is only known at the Tracking Area (TA) level. If data needs to be sent to a UE in idle state, the network has to wake up the UE via paging so that the UE can be in an active state to receive the data. Currently, paging is performed on a TA-wide basis. That is, in order to wake up the UE, a paging message is sent over the radio network in every cell belonging to the TA associated with the UE. A UE in the idle state is configured to wake up periodically to check for a paging message to see if there is any incoming data. If the UE receives a paging message, the UE switches back to the active state to receive the data.

Note that the GNB broadcasts RRC PAGING in all cells under the tracking areas according to the "Tracking Area Identity (TAI) List for Paging" in NGAP PAGING to page UE. However, since the 5G Core Network (5GC) sends thousands of Paging messages in a second, this results in great waste of air interface resources as the Distributed Unit (DU) needs to send more Paging messages.

For example, if a GNB having 256 cells and all of those are under the same Tracking Area needs to send a Page a UE, the GNB will have to send the RRC PAGING message in all 256 cells. Note that one RRC PAGING message can carry up to 32 paging records. If DU has paging records greater than 32, it needs to wait for the next Paging Opportunity (PO) of that UE to schedule the transmission. Therefore, a larger number of paging messages from 5GC during peak hours can lead to delays, draining all paging records in DU or record drops, which can in turn lead to retransmissions from 5GC. Thus, there is a need for an optimized paging of a UE in an O-RAN communication system without the above mentioned shortcomings.

SUMMARY

In one general aspect, a method of optimizing paging a User Equipment (UE) in an Open Radio Access Network (O-RAN) communication system is provided. The method includes establishing an E2 connection between a GNB Central Unit Control Plane (GNB-CUCP) and an O-RAN Near-Real Time (Near-RT) RAN Intelligent Controller (RIC) hosting an xApp; initiating a UE subscription procedure by the Near-RT RIC; sending by the GNB-CUCP cell location information of the UE to the Near-RT RIC upon a UE context release; creating and maintaining a record of cell locations where the UE was attached via the xApp; retrieving a current list of cell location information from the Near-RT RIC xApp by the GNB-CUCP; storing by the GNB-CUCP the current record of cell location information; and paging the UE in a subset of cells corresponding to the current record of cell location information, the subset of cells is a subset of the cells in a Tracking Area (TA) of the GNB-CUCP.

Implementations of the method may include one or more of the following features. In the method, the cell location of the UE is ascertained according to a 5G-Serving Temporary Mobile Subscriber Identity (5G-S-TMSI) and New Radio (NR) Cell Global Identifier (NCGI or NRCGI), according to an embodiment. In the method, the GNB-CUCP sends the 5G-S-TMSI and NCGI in an Experimental E2 Application Protocol (E2AP) indication, according to an embodiment. In the method, the xApp creates and maintains a 5G-S-TMSI record based on the E2AP indication, according to an embodiment. In the method, the GNB retrieves a current 5G-S-TMSI and NCGI list via a RIC Control Request, according to an embodiment. In the method, the GNB-CUCP stores the 5G-S-TMSI received in the RIC Control Request, according to an embodiment. The method further including paging the UE in all cells of the TA of the GNB when a paging retry timer expires, according to an embodiment. In the method, paging the UE is based on a new Experimental E2 Service Model (E2SM), according to an embodiment. In the method, the GNB-CUCP receives a Next Generation Application Protocol (NGAP) paging message from an Access Mobility Function (AMF), according to an embodiment.

In another general aspect, an Open Radio Access Network (O-RAN) wireless communication system is provided. The Open Radio Access Network (O-RAN) wireless communication system includes a GNB Central Unit Control Plane (GNB-CUCP) configured to establish a connection with a Near-RT RIC via an E2 interface; a User Equipment (UE); a plurality of cells in a Tracking Area (TA) of the GNB-CUCP; and an O-RAN Near-Real Time (Near-RT) RAN Intelligent Controller (RIC) hosting an xApp and configured to initiate a subscription procedure with the UE, the GNB-CUCP is configured to send cell location information of the UE to the Near-RT RIC upon a UE context release procedure, the Near-RT RIC is further configured to create and maintain a record of the cell location information received from the GNB-CUCP via the xApp, and the GNB-CUCP is configured to page the UE in a subset of cells from the plurality of cells in the TA, the subset of cells corresponding to the record of cell location information created and maintained by via the xApp.

Implementations of the O-RAN wireless communication system may include one or more of the following features. In the O-RAN wireless communication system, the cell location information is established according to a 5G-Serving Temporary Mobile Subscriber Identity (5G-S-TMSI) and New Radio (NR) Cell Global Identifier (NCGI), according to an embodiment. In the O-RAN wireless communication system, the GNB-CUCP sends the 5G-S-TMSI and NCGI in an Experimental E2 Application Protocol (E2AP) indication, according to an embodiment. In the O-RAN wireless communication system, the xApp creates and maintains a 5G-S-TMSI/NCGI record based on the E2AP indication, according to an embodiment. In the O-RAN wireless communication system, the GNB-CUCP retrieves a current 5G-S-TMSI/NCGI list via a RIC Control Request, according to an embodiment. In the O-RAN wireless communication system, the GNB-CUCP stores the 5G-S-TMSI/NCGI received in the RIC Control Request, according to an embodiment. In the O-RAN wireless communication system, the GNB-CUCP is further configured to page the UE in all cells of the TA of the GNB-CUCP upon expiration of a paging retry timer, according to an embodiment. In the O-RAN wireless communication system, paging the UE is based on a new Experimental E2 Service Model (E2SM), according to an embodiment. The O-RAN communication system further including an Access Mobility Function (AMF), and the GNB-CUCP receives a Next Generation Application Protocol (NGAP) paging message from the AMF, according to an embodiment.

DETAILED DESCRIPTION

Figure 1:
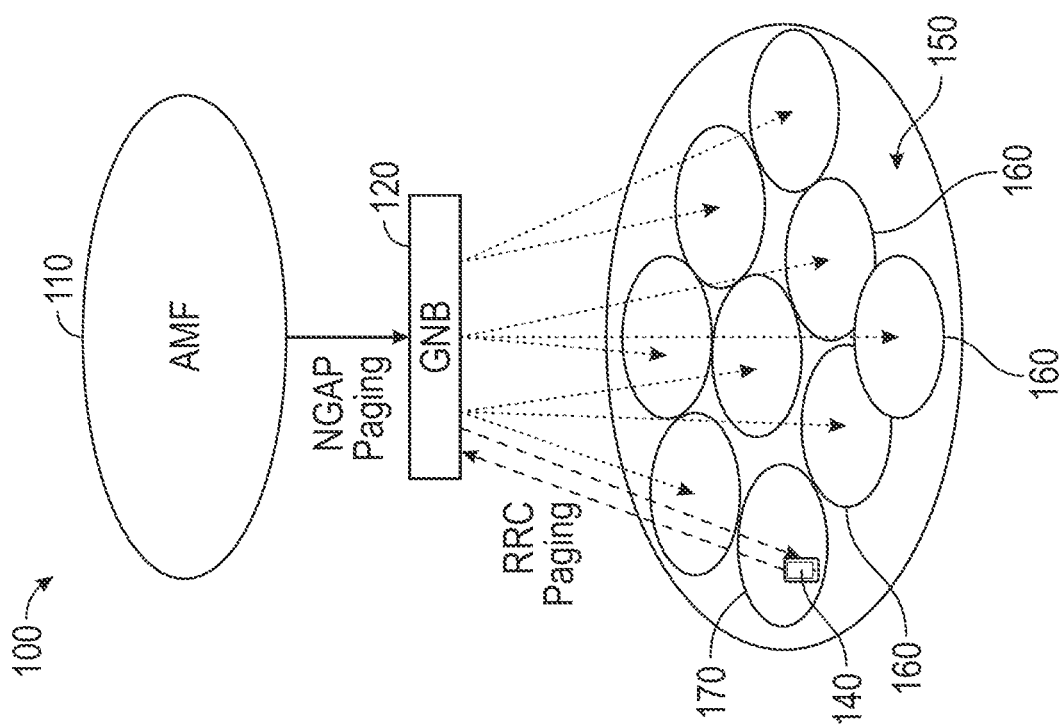
FIG. 1 illustrates an existing paging architecture in an Open Radio Access Network (O-RAN)
Figure 3A:
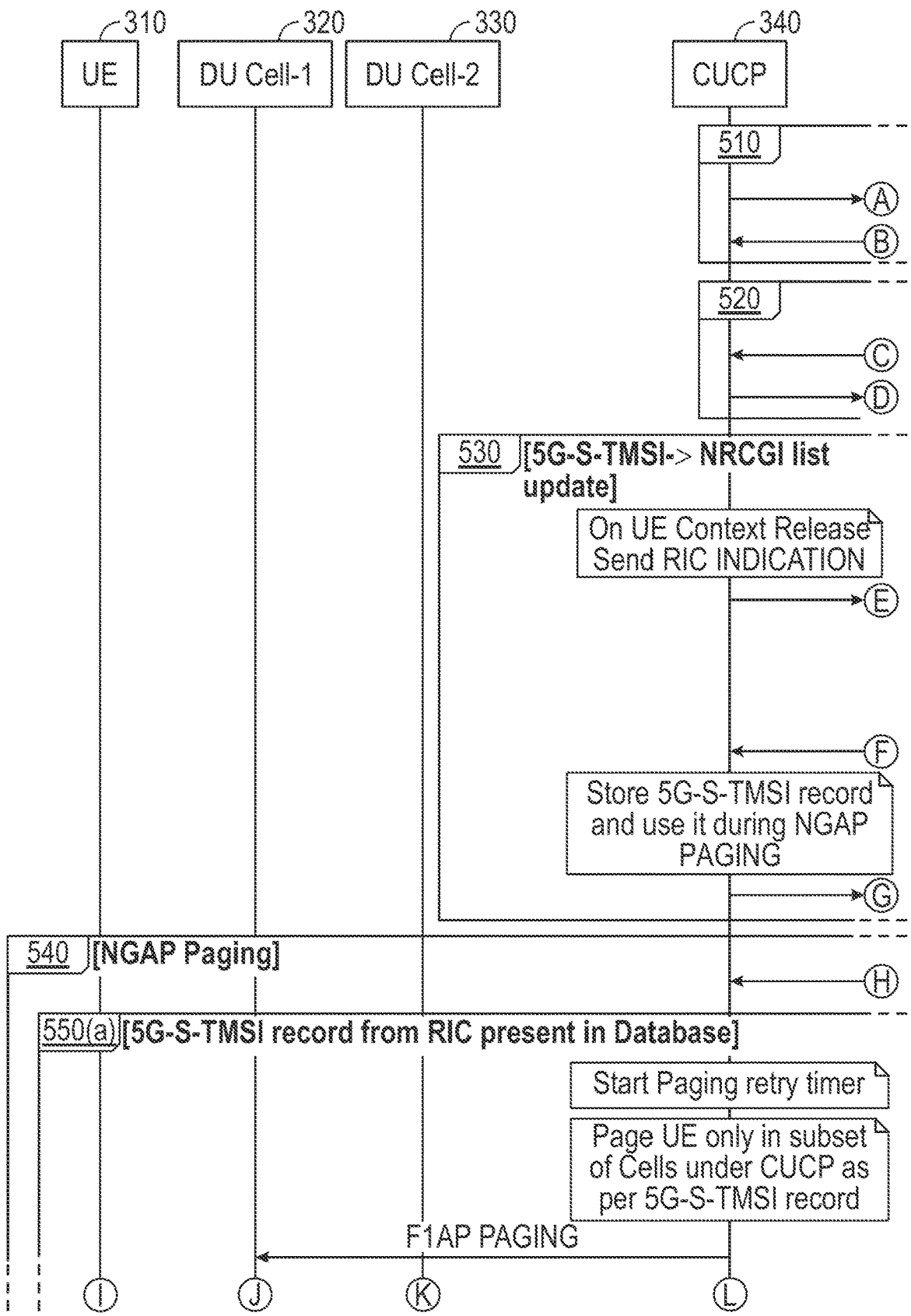
FIGS. 3A-3D show the relevant message flows for paging according to an example embodiment.
Figure 3B:
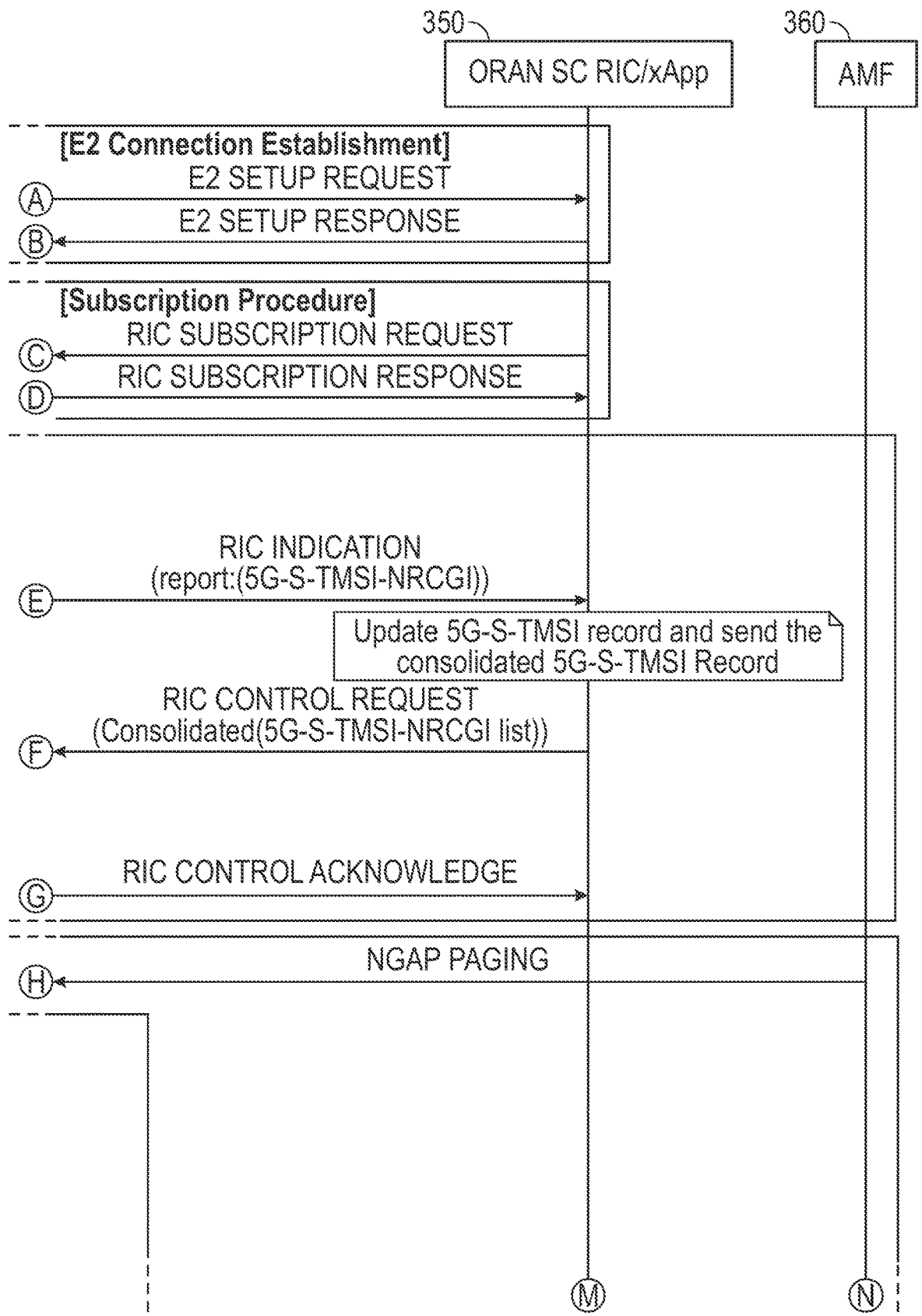
Figure 3C:
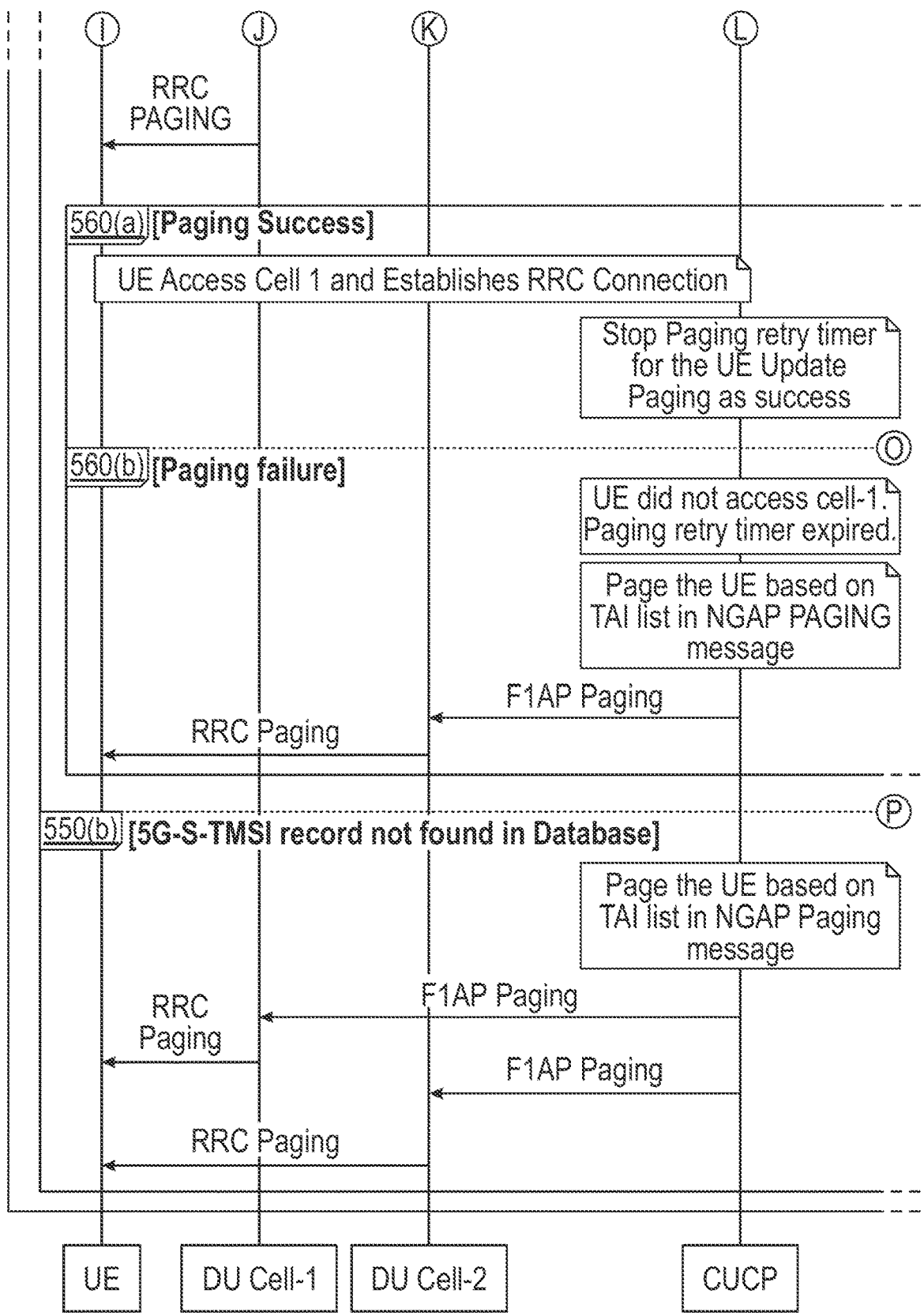
Figure 3D:
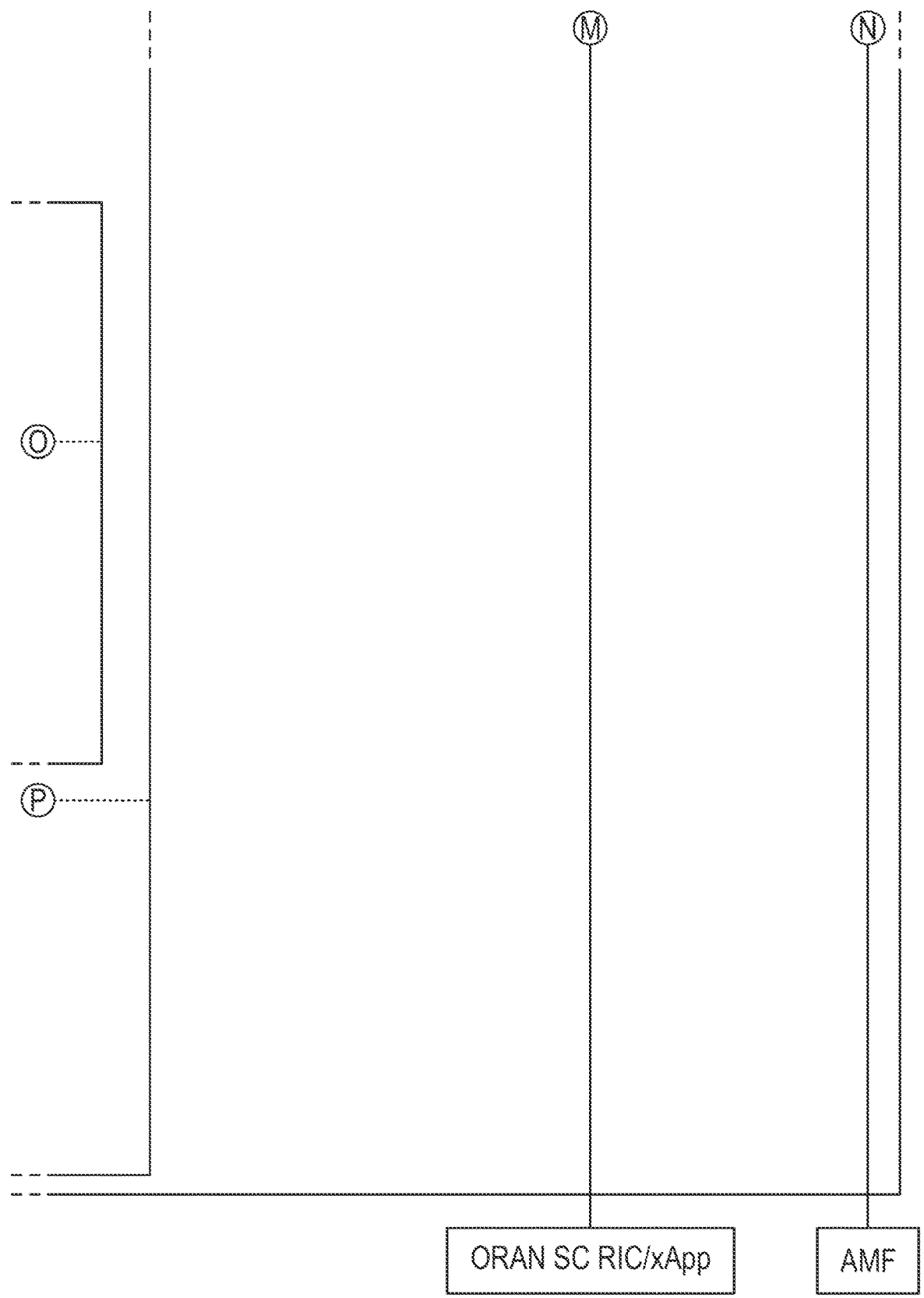

FIG. 1 is an existing paging architecture in an Open Radio Access Network (O-RAN) 100. When an incoming call or Downlink (DL) Data arrives for a User Equipment (UE) 140 in RRC_IDLE state, the Access and Mobility Management Function (AMF) 110 pages the UE 140 in the Tracking Areas (TAs) 150 selected based on the UE's mobility history. In the present example, UE 140 is in Cell 170, and the TA includes Cell 170 and other Cells 160. The AMF 110 sends a Next Generation Application Protocol (NGAP) PAGING with a list of Tracking Area Codes (TACs) to all GNBs 120 under the selected tracking areas. Cells 160, 170 under each GNB 120 having the same TAC page the UE 140 by sending a UE RRC PAGING message. Since UEs in RRC_IDLE state are configured to wake up periodically to listen to paging in respective Paging Frame (PF) and Paging Opportunity (PO), the UE 140 receives the page when it wakes up.

Figure 2:
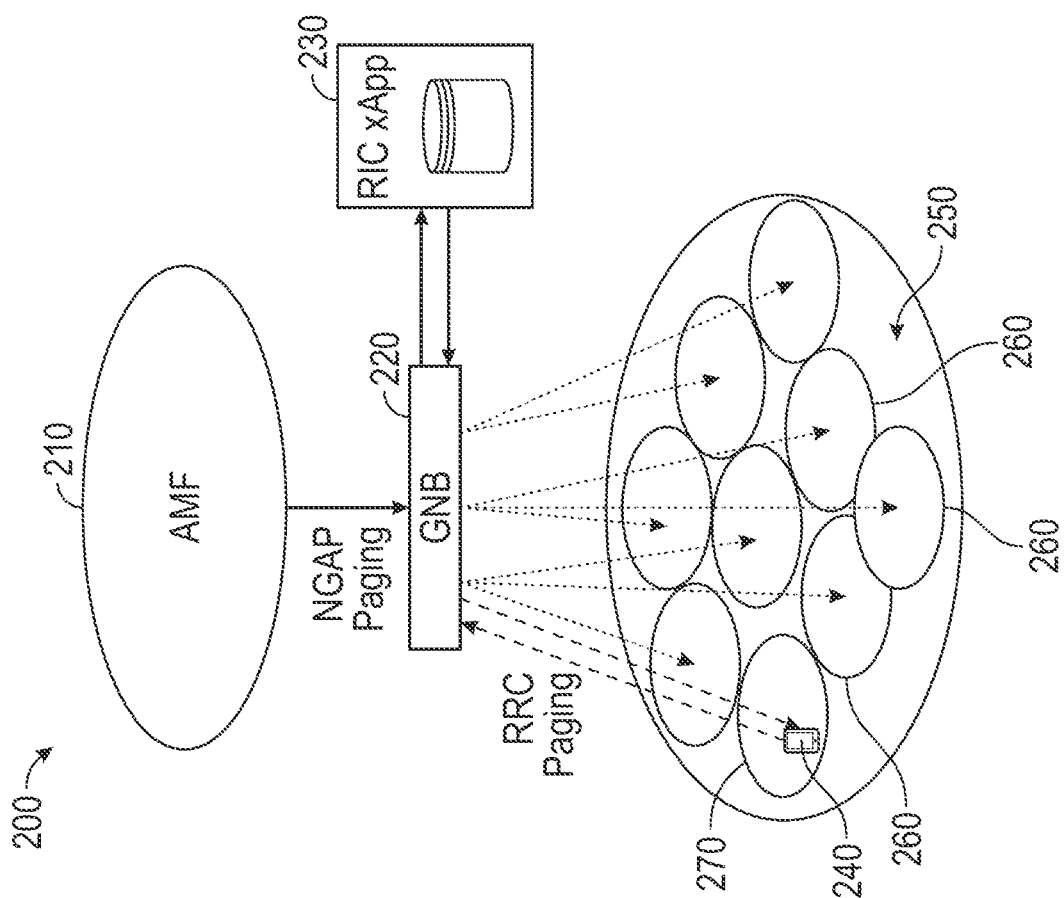
FIG. 2 illustrates a paging architecture in an O-RAN according to an example embodiment.

Instead of paging the UE in all cells under a TA (Tracking Area), the GNB can page in a subset of cells based on a record of cell locations where the UE was attached. FIG. 2 is a paging architecture in an Open Radio Access Network (O-RAN) 200 according to an embodiment. Here, a record of cell locations where the UE 240 was attached is created and maintained by the software tool xApp in the Near RT RIC 230. When an incoming call or Downlink (DL) Data arrives for a User Equipment (UE) 240 in RRC_IDLE state, the Access and Mobility Management Function (AMF) 210 pages the UE 240 in the Tracking Areas (TAs) 250 selected based on the UE's mobility history. In the present example, UE 240 is in Cell 270, and the TA includes Cell 270 and other Cells 260. The AMF 210 sends a Next Generation Application Protocol (NGAP) PAGING with a list of Tracking Area Codes (TACs) to all GNBs 220 under the selected tracking areas. The GNB 220 obtains a record of cell locations where the UE 240 was attached, and based on the record, selects a subset of the cells 160, 170 under each GNB 220 having the same TAC and pages the UE 240 by sending a UE RRC PAGING message. Since only a subset of cells 160, 170 are involved in paging the UE 240, the paging traffic is reduced.

In an embodiment, the software tool xApp hosted in the RIC at Near RT is used to create and maintain a UE history at Near RT RIC. During a UE Attach, the AMF allocates a 5G-S-TMSI to the UE, and the UE uses this identity in subsequent Attaches. On the UE context release, the GNB sends the 5G-S-TMSI and NRCGI to the Near RT RIC. In the Near RT RIC, the xApp creates and maintains the history of Cells where UE was attached, i.e., 5G-S-TMSI to List of NRCGIs in the database. The GNB retrieves this 5G-S-TMSI record information from the Near RT RIC xApp at the time of the UE release. When a NGAP PAGING arrives from the 5GC, and if the GNB has the 5G-S-TMSI record in database based on received "NGAP PAGING→UE Paging Identity→5G-S-TMSI", the NGB can optimally page the UE based on the UE history. This will greatly reduce the Paging load in the GNB.

This also reduces the number of RRC PAGING messages over F1 Application Protocol (F1AP) and time synchronization error budget Uu. A reduced load in DU will help to reduce Paging load in DU because RRC Paging is more focused on subset of cells, and will also help to schedule the rest of Paging messages faster instead of keeping them in queue for the next PO. A reduced load in DU will further help to reduce the number of NGAP PAGING message retransmissions.

FIGS. 3A-3D show the relevant message flows for optimizing the paging traffic according to an embodiment. For simplicity, the TA in the present example includes only two cells (Cell-1 and Cell-2) in which the UE 310 may reside.

In the E2 Connection Establishment procedure 510, the CUCP 340 sends an E2 SETUP REQUEST message to the ORAN SC RIC/xApp 350, and the ORAN SC RIC/xApp 350 replies with a E2 SETUP RESPONSE message. In the subscription procedure 520, the ORAN SC RIC/xApp 350 sends a RIC SUBSCRIPTION REQUEST to the CUCP 340, and the CUCP 340 replies with a RIC SUBSCRIPTION RESPONSE message.

In the 5G-S-TMSI to NRCGI List Update procedure 530, the CUCP 340 sends a RIC INDICATION (report: (5G-S-TMSI.NRCGI)) to the ORAN SC RIC/xApp 350 on UE Context Release, the ORAN SC RIC/xApp 350 updates the 5G-S-TMSI record and sends the consolidated 5G-S-TMSI record to the CUCP 340, and the CUCP 340 stores the 5G-S-TMSI record and use it during NGAP Paging, and sends a RIC CONTROL ACKNOWLEDGE message to the ORAN SC RIC/xApp 350.

In the NGAP Paging procedure 540, the AMF 360 sends a NGAP PAGING message to CUCP 340.

In the case 550(a) where the 5G-S-TMSI record from RIC is present in the database, the CUCP starts the Paging retry timer upon receipt of the NGAP PAGING message from the AMF. The CUCP page the UE only in a subset of Cells under CUCP according to the 5G-S-TMSI record. In this simplified example, Cell-1 is in the subset but Cell-2 is not in the subset, the CUCP sends F1AP PAGING message to the DU 320 in Cell-1, and the DU 320 in Cell-1 sends an RRC PAGING message to the UE 310. In the case 560(a) where the paging succeeds, the UE 310 accesses Cell-1 and establishes RRG Connection, and the CUCP stops the Paging retry timer for the UE and updates the Paging as success. In the case 560(b) where the paging fails, the UE 310 does not access Cell-1 and the Paging retry time expires, the CUCP page the UE 310 based on the TAI list in the NGAP PAGING message. In the present example, the CUCP sends the F1AP Paging message to all cells in the TA, including the DU 330 in Cell-2, and the DU 330 in Cell-2 sends an RRC PAGING message to the UE 310.

In the case 550(*b*) where the 5G-S-TMSI record from RIC is not found in the database, the CUCP sends a F1AP PAGING message to the DU 320 in Cell-1 and also a F1AP PAGING message to the DU 330 in Cell-2, as both Cell-1 and Cell-2 are included in the TA. The DU 320 in Cell-1 sends an RRC PAGING message to UE 310, and the DU 330 in Cell-2 also sends an RRC PAGING message to UE 310.

Thus, the above example message flows for optimizing the paging traffic according to an embodiment clearly demonstrate an overall reduction in paging traffic in the ORAN.

Other variations to the disclosed embodiments can be understood and effected by those skilled in the art in practicing the claimed features, from a study of the drawings, the disclosure, and the appended claims.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Operations like acquiring, accessing, analyzing, capturing, comparing, determining, displaying, inputting, obtaining, outputting, providing, store or storing, calculating, simulating, receiving, warning, and stopping can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A method of optimizing paging a User Equipment (UE) in an Open Radio Access Network (O-RAN) communication system, the method comprising:
    establishing an E2 connection between a GNB Central Unit Control Plane (GNB-CUCP) and an O-RAN Near-Real Time (Near-RT) RAN Intelligent Controller (RIC) hosting an xApp;
    initiating a UE subscription procedure by the Near-RT RIC;
    sending by the GNB-CUCP cell location information of the UE to the Near-RT RIC upon a UE context release;
    creating and maintaining a record of cell locations where the UE was attached via the xApp;
    retrieving a current list of cell location information from the Near-RT RIC xApp by the GNB-CUCP;
    storing by the GNB-CUCP the current list of cell location information; and
    paging, by the GNB-CUCP, the UE in a subset of cells corresponding to the current record of cell location information, wherein the subset of cells is a subset of the cells in a Tracking Area (TA) of the GNB-CUCP.

2. The method according to claim 1, wherein the cell location of the UE is ascertained according to a 5G-Serving Temporary Mobile Subscriber Identity (5G-S-TMSI) and New Radio (NR) Cell Global Identifier (NCGI).

3. The method according to claim 2, wherein the GNB-CUCP sends the 5G-S-TMSI and NCGI in an Experimental E2 Application Protocol (E2AP) indication.

4. The method according to claim 3, wherein the xApp creates and maintains a 5G-S-TMSI record based on the E2AP indication.

5. The method according to claim 4, wherein the GNB retrieves a current 5G-S-TMSI and NCGI list via a RIC Control Request.

6. The method according to claim 5, wherein the GNB-CUCP stores the 5G-S-TMSI received in the RIC Control Request.

7. The method according to claim 1, further comprising paging the UE in all cells of the TA of the GNB when a paging retry timer expires.

8. The method according to claim 6, wherein paging the UE is based on a new Experimental E2 Service Model (E2SM).

9. The method according to claim 1, wherein the GNB-CUCP receives a Next Generation Application Protocol (NGAP) paging message from an Access Mobility Function (AMF).

10. An Open Radio Access Network (O-RAN) communication system comprising:
    a GNB Central Unit Control Plane (GNB-CUCP) configured to establish a connection with a Near-RT RIC via an E2 interface;
    a plurality of cells in a Tracking Area (TA) of the GNB-CUCP; and
    an O-RAN Near-Real Time (Near-RT) RAN Intelligent Controller (RIC) hosting an xApp and configured to initiate a subscription procedure with a User Equipment (UE), wherein
    the GNB-CUCP is configured to send cell location information of the UE to the Near-RT RIC upon a UE context release procedure, wherein
    the Near-RT RIC is further configured to create and maintain a record of the cell location information received from the GNB-CUCP via the xApp, and wherein
    the GNB-CUCP is configured to retrieve a current list of cell location information from the xApp, store the current list of cell location information, and page the UE in a subset of cells corresponding to the current record of cell location information, wherein the subset of cells is from the plurality of cells in the TA.

11. The O-RAN communication system according to claim 10, wherein the cell location information is established according to a 5G-Serving Temporary Mobile Subscriber Identity (5G-S-TMSI) and New Radio (NR) Cell Global Identifier (NCGI).

12. The O-RAN communication system according to claim 11, wherein the GNB-CUCP sends the 5G-S-TMSI and NCGI in an Experimental E2 Application Protocol (E2AP) indication.

13. The O-RAN communication system according to claim 12, wherein the xApp creates and maintains a 5G-S-TMSI/NCGI record based on the E2AP indication.

14. The O-RAN communication system according to claim 13, wherein the GNB-CUCP retrieves a current 5G-S-TMSI/NCGI list via a RIC Control Request.

15. The O-RAN communication system according to claim 14, wherein the GNB-CUCP stores the 5G-S-TMSI/NCGI received in the RIC Control Request.

16. The O-RAN communication system according to claim 10, wherein the GNB-CUCP is further configured to page the UE in all cells of the TA of the GNB-CUCP upon expiration of a paging retry timer.

17. The O-RAN communication system according to claim 15, wherein paging the UE is based on a new Experimental E2 Service Model (E2SM).

18. The O-RAN communication system according to claim 10, further comprising an Access Mobility Function (AMF), wherein the GNB-CUCP receives a Next Generation Application Protocol (NGAP) paging message from the AMF.

\* \* \* \* \*